106. COMPOSITIONS, COATING OR PLASTIC.

88  Patented May 4, 1937

2,079,338

UNITED STATES PATENT OFFICE 2,079,338

CEMENTITIOUS MATERIAL

Carlisle K. Roos, Fort Dodge, Iowa, assignor to United States Gypsum Company, Chicago, Ill., a corporation of Illinois No Drawing. Application January 19, 1925, Serial No. 3,477

5 Claims.   (Cl. 106—24)

This invention relates to improvements in building material and more particularly to the production of cementitious material of a porous structure which is obtained by the use of confined gas as an aggregate, rather than gas as an expansive force to distend the volume of the cementitious material during the setting process.

Cementitious material and particularly calcined gypsum has been employed for years as a finishing coat or covering for the interior walls of buildings, and has been molded into blocks to form partitions and tiles to form roofs and floors, it has also been employed as a filler in poured roofs and floors and as a core for plaster board and plaster wallboard, as well as having been employed in other forms and articles. Calcined gypsum on account of its non-conductive and fire resisting qualities has been a desirable product for the purposes above described. In wall coverings the calcined gypsum has been used with sand as an aggregate to give it body for the first coats and a retarder to delay the setting so that it may be properly applied and in other cases fiber and sawdust has been added as an aggregate in lieu of the heavy sand aggregate which reduces the weight of the finished product. In the formation of roofs, floors, tile, block and plaster board or wallboard the addition of fiber or sawdust aggregate detracts from its fire resisting quality which is as desirable in these products as decreasing the weight of the finished product.

To overcome this objection and produce such articles of calcined gypsum in which the weight is greatly reduced and in which the articles possess the qualities of unadulterated set gypsum, certain chemicals or minerals have been added to the dry calcined gypsum which will upon the addition of water evolve a gas causing the mixture to puff out or expand in volume and upon the setting of the gypsum will form a porous body so that articles thus produced will be of less weight per volume and be as fire resisting and better insulating mediums than unadulterated set gypsum.

It is an object of this invention to produce a porous body of set calcined gypsum without the use or addition of chemicals or gas producing agents to the gypsum which react with the water to form an expanded plastic mass to be molded or otherwise formed into the required shape of the article desired. To this end an inert foam is formed comprising a plurality of minute bubbles or air the enveloping films of which are so individual in mass form that these air bubbles are in effect an aggregate and then as the calcined gypsum is being mixed with water, in the same manner as ordinarily employed to form the desired article, such inert aggregate of minute air bubbles is thoroughly incorporated in the plastic mass during the mixing process.

The incorporation of the air or gas aggregate has the same effect upon reducing the density of the plastic mass as any other aggregate lighter in weight than the cementitious material itself and reduces density of the entire mass to give lighter weight per unit volume. Because the air or gas is so much lighter in weight than any solid aggregate the reduction in unit volume weights is correspondingly much greater and due to the fact that the air or gas is so thoroughly confined in such a tough film of film forming substance, the air or gas will remain confined during the mixing process of cementitious solid and water and thus permit of the novel aggregate being incorporated therein. Any amount of porosity desired can be produced and a definite size of porosity can be maintained, because the tough filmed bubbles of air or gas maintain their identity until the gypsum has set, and the tough film envelope of the confined air or gas aggregate is replaced by a permanent set wall of cementitious material with the air or gas still confined.

This application is a continuation-in-part of my prior application Ser. No. 733,197, filed August 20, 1924, now U. S. Patent No. 2,017,022, which describes broadly the application of this principle of reducing the weight of articles made from calcined gypsum by the incorporation of a foam of minute air bubbles in the plastic mass and specifically describes the reinforcing of the air bubble enveloping films by an inorganic stabilizer, such as calcined gypsum, before the foam is mixed with the plastic mass. This prior application describes the foam being whipped into a fine grained form and stabilized by the addition of a relatively small quantity of calcined gypsum which reinforces the walls of the bubbles to such an extent that the foam might be preserved indefinitely. It also states that other reagents such as gelatin, dextrin and gum arabic added to the foam will reinforce the walls of the bubbles and produce a preservative effect.

In the formation of articles produced in accordance with this invention which are dried or set in the open air a foam of air bubbles stabilized by an inorganic agent, such as calcined gypsum, is desirable, while in the formation of plaster board and other articles subjected to the heat of a drying kiln to set a foam with air bubbles stabilized by organic agents is desirable. In molded articles, where no external pressure is applied, the air bubble walls may be reinforced, as specifically described in my said prior application, by calcined gypsum or other inorganic agent which will harden and produce a rigid and more or less fragile wall, and foam bubbles so stabilized will act satisfactorily in such articles but where external pressure is applied to air bubble foam and cementitious material mixture the best result is obtained by a foam in which the walls of the air bubbles are tough and pliable.

In applying this invention to the manufacture of plaster wallboard such as made on a continuous machine like that described in the Utzman Patent 1,330,413, February 10, 1920, and afterwards dried in a drying kiln the foam is produced and then deposited upon the mixing belt where the calcined gypsum and water are mixed by the mixing fingers to form a homogeneous mass to be deposited upon the bottom cover sheet of the wallboard as it advances thereunder. It is seen that the addition of an inert foam at this step in the process of making wallboard is treating the foam in the same manner as any other aggregate that may be desired to be incorporated in the body of the core of the wallboard. In the course of formation of plaster wallboard on machines similar to the above referred to Utzman patent the plastic mass deposited on the bottom cover sheet is advanced between pressure rolls as the top cover sheet is applied, the pressure so applied to the plastic mass collecting in front of the rolls spreads it out to form a core between the top and bottom cover sheets of even thickness between the edges.

In such an application of this invention the first step is to prepare a solution capable of being converted into a foam by agitation. There are several types of reagents which will produce such a foaming solution or mixture such as solutions, mixtures, or emulsions of flotation oils, various organic compounds similar to soap, saponin, soap bark, albumens, licorice, etc. The efficiency of the above mentioned reagents of course varies considerably and it has been found that a water solution containing up to three percent of powdered soap bark produces satisfactory results. Such a solution of soap bark and water may be agitated or whipped into a foam in the same manner as eggs or cream.

Immediately after the formation of satisfactory foam a relatively small quantity of gelatin, dextrin, gum arabic or other organic colloid such as rice flour or other farinaceous paste is added and stirred into it thoroughly. The addition of this colloidal agent will reinforce the film enveloping the air bubbles so that each one will have tough and pliable walls and enable the bubbles to form an aggregate that may be substituted for solid aggregate. The stabilized foam is then deposited on the mixing belt of the machine and stirred into the mixture of water and calcined gypsum thereon by the mixing fingers until the whole is a homogeneous mass as it is deposited on the advancing covering sheet. The walls of the air bubbles incorporated in the plastic mass being tough and pliable not only remain intact during the mixing with the cementitious material and water but are not broken or changed in volume and the aggregate formation is maintained in passing through the pressure rolls as the board is formed. The quantity of foam incorporated into the wet mass on the mixing belt will of course determine its cellular structure, and this in turn determines the bulk and weight of the finished product. The wallboards so formed are quickly dried by passing through a drying kiln as they are removed from the discharge end of the machine.

In such an application of this invention the foam is continuously mixed, stabilized and immediately incorporated into the plastic core material which is continuously deposited on the continuously moving cover sheet and immediately passed through the pressure rolls and the board so formed continuously cut and removed from the machine and immediately entered into the drying kilns from which it emerges the finished product so that but little time is consumed from the initial stabilization of the air bubble walls to the completion of the finished product and the toughness and pliability of the air bubble walls is of more importance and more necessary to such an article than the permanency of the preservatives of the air bubble formation as is required in a slow setting article.

What I claim is:

1. A composition of matter comprising a cementitious material having an aggregate of bubbles incorporated therein to increase its normal bulk, the walls of said bubbles being reinforced with a colloidal agent from the group comprising gelatin, gum arabic, farinaceous paste, rice flour and dextrin to render them tough and pliable.

2. The process of producing a porous cement which comprises first forming a foam, stabilizing the same by the addition of a colloid to reinforce the walls of the bubbles constituting the foam thereby rendering said walls tough and pliable and the foam substantially non-collapsible, incorporating said foam as an aggregate in a plastic cement mixture, and then allowing the same to harden.

3. A composition of material comprising a cement and an aggregate of bubbles having tough and pliable walls incorporated therein to increase the normal bulk and to decrease the normal weight of the cement, said bubbles resulting from a wet foam initially formed before being added to the cement and to which foam a colloid has been added prior to its incorporation with the cement to reinforce the walls enveloping the air bubbles with tough, pliable and substantially non-collapsing films.

4. The process of producing porous cement which comprises whipping an aqueous solution of a foaming agent into a foam or lather, preventing the subsequent collapse of said foam by the addition thereto of a gummy colloidal stabilizing agent, and thereupon incorporating said substantially non-collapsible foam into a slurry of a cementitious substance capable of setting.

5. The process of producing a moldable cementitious product which comprises forming a foam, then rendering the walls of the bubbles of said foam tough and pliable by adding to said foam after formation a colloidal substance, and then mixing the foam with a cement.

CARLISLE K. ROOS.